(12) United States Patent
Yim et al.

(10) Patent No.: US 9,726,935 B2
(45) Date of Patent: Aug. 8, 2017

(54) LIQUID CRYSTAL DISPLAY

(71) Applicant: Samsung Display Co., Ltd., Yongin (KR)

(72) Inventors: Taekyung Yim, Seoul (KR);
Hyungjune Kim, Anyang-si (KR);
Hoonsik Kim, Seoul (KR); Osung Seo, Seoul (KR); YeoGeon Yoon, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 24 days.

(21) Appl. No.: 14/023,067

(22) Filed: Sep. 10, 2013

(65) Prior Publication Data

US 2014/0307189 A1    Oct. 16, 2014

(30) Foreign Application Priority Data

Apr. 11, 2013  (KR) .................. 10-2013-0039950

(51) Int. Cl.
 *G02F 1/1341* (2006.01)
 *G02F 1/1339* (2006.01)
 *G02F 1/1333* (2006.01)

(52) U.S. Cl.
CPC ...... *G02F 1/1339* (2013.01); *G02F 1/133345* (2013.01); *B32B 2457/202* (2013.01); *G02F 2001/133311* (2013.01); *G02F 2001/133357* (2013.01)

(58) Field of Classification Search
None
See application file for complete search history.

(56) References Cited

U.S. PATENT DOCUMENTS

| | | | |
|---|---|---|---|
| 5,808,715 A | 9/1998 | Tsai et al. | |
| 6,252,297 B1 | 6/2001 | Kemmochi et al. | |
| 6,323,924 B1 | 11/2001 | Matsuoka et al. | |
| 6,741,315 B1 | 5/2004 | Uchiyama | |
| 7,113,248 B2 | 9/2006 | Chung et al. | |
| 7,830,490 B2 * | 11/2010 | Park | 349/153 |
| 2007/0076158 A1 * | 4/2007 | Jung et al. | 349/143 |
| 2009/0258237 A1 * | 10/2009 | Choi et al. | 428/447 |
| 2010/0081070 A1 * | 4/2010 | Taguchi | 430/7 |
| 2010/0128015 A1 * | 5/2010 | Feenstra et al. | 345/211 |
| 2011/0007233 A1 | 1/2011 | Matsui et al. | |

(Continued)

FOREIGN PATENT DOCUMENTS

| | | |
|---|---|---|
| JP | 06-018867 | 1/1994 |
| JP | 08-184816 | 7/1996 |

(Continued)

*Primary Examiner* — Anthony J Frost
(74) *Attorney, Agent, or Firm* — H.C. Park & Associates, PLC

(57) ABSTRACT

A liquid crystal display (LCD) includes a first base substrate, a pixel electrode disposed on the first base substrate, a second base substrate facing the first base substrate, and an overcoat layer disposed on the second base substrate. The overcoat layer may include at least one of polysilsesquioxane, polysilazane, or derivatives thereof. The LCD further includes a common electrode disposed on the overcoat layer to form an electric field with the pixel electrode, and a liquid crystal layer disposed between the first base substrate and the second base substrate.

16 Claims, 7 Drawing Sheets

(56) References Cited

U.S. PATENT DOCUMENTS

| | | | |
|---|---|---|---|
| 2011/0007251 A1* | 1/2011 | Yamamoto | G02F 1/133514 349/108 |
| 2012/0075559 A1 | 3/2012 | Sonoda et al. | |
| 2012/0194494 A1* | 8/2012 | Jung et al. | 345/208 |
| 2012/0206684 A1* | 8/2012 | Lee | G02F 1/1345 349/139 |
| 2012/0274869 A1 | 11/2012 | Chen et al. | |

FOREIGN PATENT DOCUMENTS

| | | |
|---|---|---|
| JP | 2001-174620 | 6/2001 |
| JP | 2004-095996 | 3/2004 |
| KR | 10-0388228 | 6/2003 |
| KR | 10-2008-0049250 | 6/2008 |

* cited by examiner

LIQUID CRYSTAL DISPLAY

CROSS REFERENCE TO RELATED APPLICATION

This U.S. non-provisional patent application claims priority from and the benefit of Korean Patent Application No. 10-2013-0039950, filed on Apr. 11, 2013, which is hereby incorporated by reference for all purposes as if fully set forth herein.

BACKGROUND

Field

Exemplary embodiments of the invention relate to a liquid crystal display having an improved display quality.

Description of the Background

A liquid crystal display may generate an electric field between two substrates, and may control an amount of light passing through a liquid crystal layer interposed between the two substrates, thereby displaying a desired image.

A lower substrate of the two substrates may include gate lines, data lines, and pixel electrodes. An upper substrate of the two substrates of the liquid crystal display may include a common electrode. The liquid crystal layer including liquid crystal molecules is interposed between the lower substrate and the upper substrate.

The liquid crystal molecules are driven by the electric field generated by the pixel electrode and the common electrode. The liquid crystal molecules control the amount of the light passing through the liquid crystal layer. However, when moisture infiltrates into the liquid crystal layer, the liquid crystal molecules may not function properly. As a result, a defect, such as a vertical line stain, an edge dark area, etc., may occur in the image.

SUMMARY

Exemplary embodiments of the invention provide a liquid crystal display having an improved display quality.

Additional features of the invention will be set forth in the description which follows, and in part will be apparent from the description, or may be learned by practice of the invention.

Exemplary embodiments of the invention disclose a liquid crystal display including a first substrate, a pixel electrode disposed on the first substrate, a second substrate facing the first substrate, and an overcoat layer disposed on the second substrate. The overcoat layer includes at least one of polysilsesquioxane, polysilazane, a derivative of the polysilsesquioxane, and a derivative of the polysilazane. The liquid crystal display further includes a common electrode disposed on the overcoat layer and a liquid crystal layer disposed between the first substrate and the second substrate. The common electrode and the pixel electrode are configured to provide an electric field.

Exemplary embodiments of the invention also disclose a liquid crystal display including a first substrate, a pixel electrode disposed on the first substrate, a second substrate facing the first substrate, and an overcoat layer disposed on the second substrate. The overcoat layer includes an organic polymer. The liquid crystal display further includes a common electrode disposed on the overcoat layer and spaced apart from the pixel electrode, a liquid crystal layer disposed between the first substrate and the second substrate, a seal part disposed between the first substrate and the second substrate to seal the liquid crystal layer, and an additional seal part disposed along an edge of the second substrate. The additional seal part is configured to cover the seal part and to prevent a surface of the seal part from being exposed. The addition seal part includes an amorphous fluoropolymer or at least one of polysilsesquioxane, polysilazane, a derivative of the polysilsesquioxane, and a derivative of the polysilazane.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
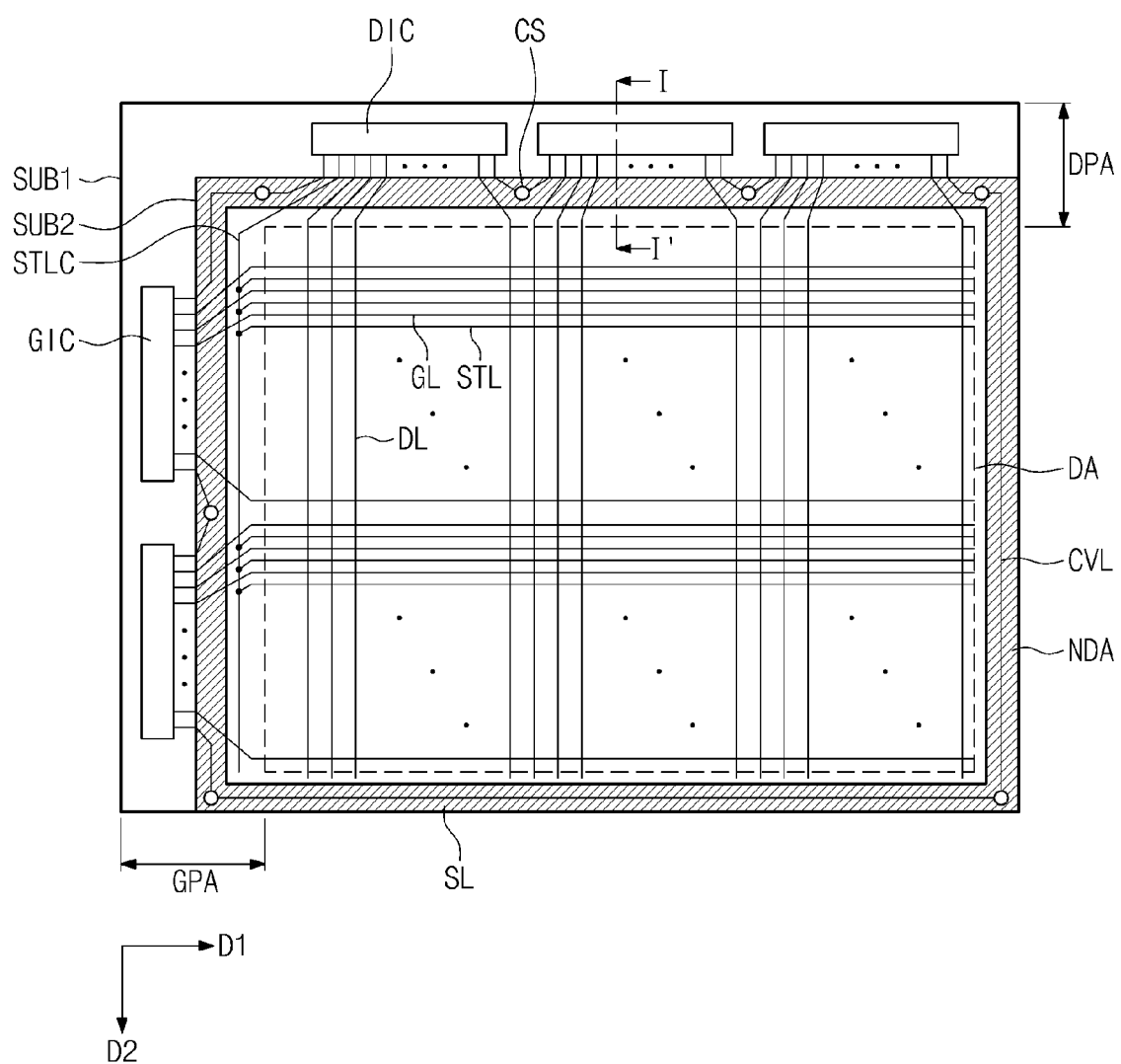
FIG. 1 is a plan view showing a liquid crystal display according to exemplary embodiments of the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ). As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be explained in detail with reference to the accompanying drawings.

Figure 2:
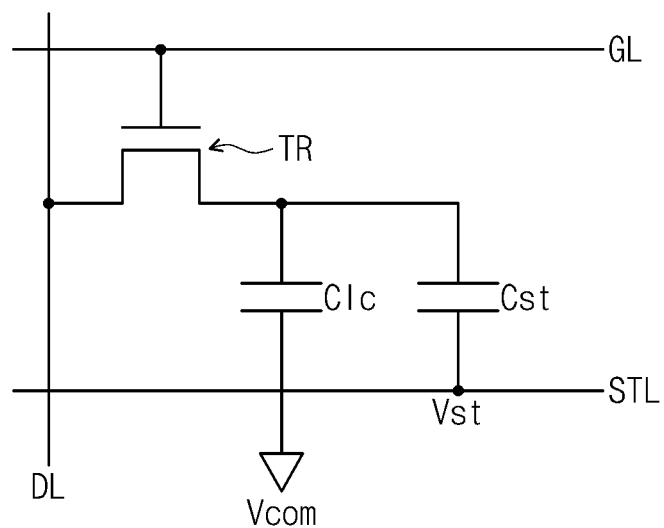
FIG. 2 is an equivalent circuit diagram showing one pixel of the liquid crystal display shown in FIG. 1 according to exemplary embodiments of the invention.
Figure 3:
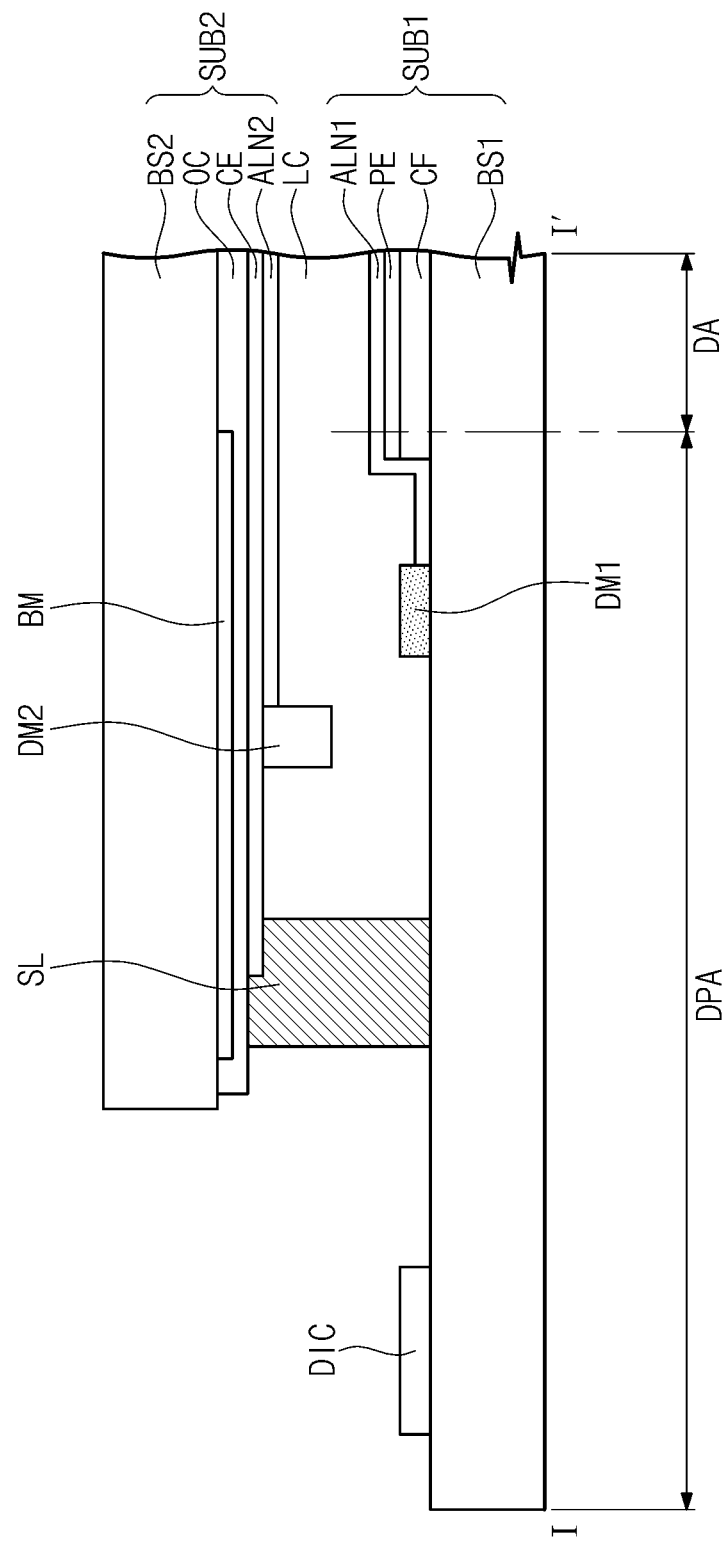
FIG. 3 is a cross-sectional view taken along a line I-I' shown in FIG. 1 according to exemplary embodiments of the invention.

FIG. 1 is a plan view showing a liquid crystal display (LCD) according to exemplary embodiments of the invention. FIG. 2 is an equivalent circuit diagram showing a pixel of the liquid crystal display shown in FIG. 1. FIG. 3 is a cross-sectional view taken along a line I-I' shown in FIG. 1.

Referring to FIGS. 1, 2, and 3, the LCD may include a first substrate SUB1, a second substrate SUB2 facing the first substrate SUB1, and a liquid crystal layer LC interposed between the first substrate SUB1 and the second substrate SUB2. The LCD may include a display area DA configured to display an image and a non-display area NDA surrounding the display area DA.

The first substrate SUB1 may include a first base substrate BS1 and a plurality of pixels arranged on the first base substrate SUB1 in a matrix form. The pixels may be arranged in the display area DA.

The first substrate SUB1 may include a plurality of gate lines GL, a plurality of data lines DL, and a plurality of storage lines STL. Each of the plurality of gate lines GL, each of the plurality of data lines DL, and each of the plurality of storage lines STL may be connected to a corresponding pixel. The gate lines GL, the data lines DL, and the storage lines STL constitute a wiring part.

The gate lines GL extend in a first direction D1 and are spaced apart from each other at regular intervals. The data lines DL extend in a second direction D2 substantially perpendicular to the first direction D1 and are spaced apart from each other at regular intervals. The gate lines GL may be disposed on a layer different from a layer on which the data lines DL are disposed. The gate lines GL may be insulated from the data lines DL. The storage lines STL may be disposed on the same layer as the gate lines GL, may extend in the first direction D1, and may be spaced apart from each other at regular intervals.

The display area DA includes a plurality of pixels areas corresponding to pixels, respectively, and the pixels areas may be defined by the gate lines GL and the data lines DL.

Referring to FIG. 2, each pixel may include a thin film transistor TR, a liquid crystal capacitor Clc, and a storage capacitor Cst. The storage line STL may be applied with a storage voltage Vst and may overlap a pixel electrode PE in each pixel to form the storage capacitor Cst. One node of the liquid crystal capacitor Clc may be provided a common voltage Vcom. The common voltage Vcom may be set at any suitable voltage. For example, in some cases, the common voltage Vcom may be a ground node (i.e., 0V).

The non-display area NDA may surround the display area DA, but is not be limited thereto or thereby. For example, the non-display area NDA may be disposed adjacent to only one side of the display area DA.

The non-display area NDA may include a pad area in which end portions of the data lines DL and the gate lines GL are disposed. For example, the non-display area NDA may include a data pad area DPA in which end portions of the data lines DL are disposed and a gate pad area GPA in which end portions of the gate lines GL are disposed.

A driving part may be provided in the pad area. For example, a data driver DIC may be provided in the data pad area DPA, and a gate driver GIC may be provided in the gate pad area GPA.

The data driver DIC may be connected to the end portions of the data lines DL in the data pad area DPA. The end portions of the data lines DL are provided with data pads (not shown) to connect to external lines. The data driver DIC may be electrically connected to the data pads of the data lines DL to apply data signals to the data pads of the data lines DL. The data driver DIC may be disposed along a long side direction of the LCD. The data driver DIC may be provided in any suitable number of drivers. Hereinafter, three data drivers DIC will be described as a representative example.

The gate driver GIC may be connected to the end portions of the gate lines GL in the gate pad area GPA. The end portions of the gate lines GL are provided with gate pads (not shown) to connect to external lines. The gate driver GIC may sequentially apply gate signals to the gate pads of the gate lines GL to scan the pixel rows along a short side of the LCD. The gate driver GIC may be provided in any suitable number of drivers. Hereinafter, two gate drivers GIC will be described as a representative example.

In some cases, the gate driver GIC may include a plurality of transistors, e.g., amorphous silicon transistors, and the gate driver GIC may be directly formed on the first substrate SUB1 through a thin film process. In these cases, the gate pad area GPA may be omitted and the gate driver GIC may be electrically and directly connected to the gate lines GL. In some cases, the data driver DIC may include a plurality of transistors, and the data driver DIC may be directly formed on the first substrate SUB1 through a thin film process. In this case, the data pad area DPA may be omitted and the data driver DIC may be electrically and directly connected to the data lines DL.

A storage connection line STLC may be disposed in the non-display area NDA. The storage connection line STLC may branch from the data driver DIC and may be connected to the storage lines STL. The storage connection line STLC may extend in the second direction D2 to connect the end portions of the storage lines STL to each other. In some cases, the storage connection line STLC may be further provided to connect other ends of the storage lines STL. The storage connection line STLC may receive the storage voltage Vst from an external device (not shown) and may apply the storage voltage Vst to the storage lines STL. The storage connection line STLC may be electrically insulated from a common voltage line CVL.

The second substrate SUB2 may include a second base substrate BS2 and a common electrode CE disposed on the second base substrate BS2. In some cases, the common electrode CE may be disposed over the entire second substrate SUB2 and may face the pixel electrode PE to form the liquid crystal capacitor Clc. The common electrode CE may be applied with a common voltage Vcom and may form an electric field with the pixel electrode PE.

The wiring part may further include a common voltage line CVL disposed on the first substrate SUB1. The common voltage line CVL may be applied with the common voltage Vcom so that the common voltage Vcom may be applied to the common electrode CE. The common voltage line CVL may be connected to at least one of the driving parts (e.g. data driver DIC, gate driver GIC). The common voltage line CVL may be disposed between the driving parts adjacent to each other, may be disposed in the non-display area NDA, and may be arranged around the display area DA.

The liquid crystal layer LC, a connection part CS, and a seal part SL may be disposed between the first substrate SUB1 and the second substrate SUB2.

The seal part SL may be disposed between the first substrate SUB1 and the second substrate SUB2 to seal the liquid crystal layer LC. The seal part SL may be disposed along an end of the second substrate SUB2 to surround the liquid crystal layer LC. The seal part SL may be formed of any suitable material, including, but not limited to, an organic polymer.

The connection part CS may directly contact the common electrode CE and the common voltage line CVL to electrically connect the common voltage line CVL to the common electrode CE. The connection part CS may be overlapped with the common electrode CE and may have a conductive spacer shape. For example, the connection part CS may be disposed between the common voltage line CVL and the common electrode CE to electrically connect the common voltage line CVL and the common electrode CE.

Since the connection part CS directly contacts the common voltage line CVL, the connection part CS may correspond to the area in which the common voltage line CVL is disposed. The common voltage line CVL may be disposed between the data drivers DIC adjacent to each other and between the gate drivers GIC adjacent to each other. The number and position of the connection part CS are not limited to being disposed between data drivers DIC and gate drivers GIC, and various positions and numbers of the connection part CS may be utilized depending on the size and arrangement of elements of the liquid crystal display.

As described hereinabove, the common voltage Vcom applied to the common voltage line CVL may be applied to the common electrode CE through the connection part CS. However, in some cases, the connection part CS may be connected to the common voltage line CVL in a different way, e.g., through a silver dotting process.

Liquid crystal molecules of the liquid crystal layer LC may be oriented based on the electric field formed by the pixel electrode PE and the common electrode CE.

In the following description, the LCD will be described according to a stacked order of the elements thereof with reference to FIGS. 1, 2, and 3.

The first base substrate BS1 may have a rectangular plate shape and may be formed of a transparent insulating material. The gate lines, the data lines, and the thin film transistors may be formed on the first base substrate BS1. The gate lines, the data lines, and the thin film transistors may be formed according to various techniques.

Color filters CF and a first dam DM1 may be disposed on the first substrate SUB1.

The color filters CF allow light to pass through each pixel and filter the light according to a predetermined wavelength resulting in the light having a color corresponding to the predetermined wavelength. The color filters CF may include a red color filter, a green color filter, or a blue color filter. The color filters CF may also include a white color filter, a cyan color filter, a magenta color filter, a yellow color filter, etc. In some cases, the color filters CF may be arranged on the second substrate SUB2 rather than the first substrate SUB1.

The first dam DM1 may be disposed in the non-display area NDA and may extend along an edge of the display area DA. The first dam DM1 may prevent a first alignment layer ALN1 from overflowing toward an edge of the first base substrate BS1 when the first alignment layer ALN1 is formed.

The first dam DM1 may be formed of the same material as at least one of the color filters CF through the same process. The first dam DM1 may have the same thickness as at least one of the color filters CF. In some cases, the first dam DM1 is formed of the same material and the same process as those of the blue color filter of the color filters CF.

The pixel electrode PE may be disposed on the color filters.

The first alignment layer ALN1 may be disposed on the pixel electrode PE. The first alignment layer ALN1 is provided in the display area DA and is prevented from overflowing to the edge of the non-display area NDA by the first dam DM1.

The first alignment layer ALN1 may include an organic and/or inorganic polymer material, e.g., polyimide, polyamic acid, polysiloxane, etc. The first alignment layer ALN1 may be used to initially align the liquid crystal molecules of the liquid crystal layer LC, and may include a polymer material in which a decomposition, dimerization, or isomerization reaction occurs by light, e.g., an ultraviolet ray or a laser. In addition, the first alignment layer ALN1 may include a polymer with reactive mesogen.

The second base substrate BS2 may have a rectangular plate shape similar to the first base substrate BS1 and may be formed of a transparent insulating material. The second base substrate BS2 may have a size slightly smaller than that of the first base substrate BS1.

The common electrode CE may be disposed on the second base substrate BS, and may overlap with the seal part SL when viewed in a plan view. Accordingly, the seal part SL may directly contact the edge of the common electrode CE.

A black matrix BM and an overcoat layer OC may be disposed between the second base substrate BS2 and the common electrode CE.

The black matrix BM may be disposed in the non-display area NDA to block light from being emitted in the non-display area.

The overcoat layer OC may be disposed between the black matrix BM and the common electrode CE. The overcoat layer OC planarizes an upper surface of the second base substrate BS2. The overcoat layer OC may include at least one of polysilsesquioxane, polysilazane, and derivatives thereof. The polysilsesquioxane, polysilazane, and/or derivatives thereof may be in a fluid state, and thus the overcoat layer OC may be formed in various ways, e.g., an inkjet method, a spin coating method, a slit coating method, etc.

The polysilsesquioxane is represented by the following chemical formula:

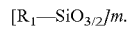

The polysilazane is represented by the following chemical formula:

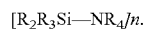

$R_1$, $R_2$, $R_3$, and $R_4$ independently denote —H (hydrogen) or one member of an alkyl group with a carbon number of 1 to 30, an alkene group with a carbon number of 1 to 30, an aryl group with a carbon number of 1 to 30, and an arylene group with a carbon number of 1 to 30, and each of "m" and "n" is in a range of 1 to 10,000.

A second dam DM2 may be disposed on the common electrode CE of the non-display area NDA. The second dam DM2 may extend along the edge of the display area DA. The second dam DM2 may prevent a second alignment layer ALN2 from overflowing toward an edge of the second base substrate BS2 when the second alignment layer ALN2 is formed. The second dam DM2 may not overlap with the first dam DM1. Although only one second dam DM2 has been shown in FIG. 3, the number of the second dams DM2 is not limited thereto, and various second dams DM2 may be used in the LCD.

The second alignment layer ALN2 may be disposed on the common electrode CE of the display area DA.

The second alignment layer ALN2 may include organic and/or inorganic polymer material, e.g., polyimide, polyamic acid, polysiloxane, etc. The second alignment layer ALN2 may initially align the liquid crystal molecules of the liquid crystal layer LC and may include a polymer material in which a decomposition, dimerization, or isomerization reaction occurs by light, e.g., an ultraviolet ray or a laser. In addition, the second alignment layer ALN2 may include a polymer with reactive mesogen.

The second alignment layer ALN2 may be disposed in the display area DA and may be prevented from overflowing to the edge of the non-display area NDA by the second dam DM2.

In the LCD, when the gate signal is applied to the gate line GL, the thin film transistor TR is turned on. Therefore, the data signal applied to the data line DL is applied to the pixel electrode PE through the turned-on thin film transistor TR. When the data signal is applied to the pixel electrode PE through the turned-on thin film transistor TR, an electric field is generated between the pixel electrode PE and the common electrode CE. Due to the electric field generated by a difference of voltages respectively applied to the common electrode CE and the pixel electrode PE, the liquid crystal molecules may be driven. Accordingly, an amount of the light passing through the liquid crystal layer LCL may be varied, and thus an image may be displayed in the LCD.

To manufacture the liquid crystal display, the first substrate SUB1 and the second substrate SUB2 may be formed, and then the seal part SL may be formed on either the first substrate SUB1 or the second substrate SUB2. Then, the liquid crystal layer LC may be formed on the first substrate SUB1 or the second substrate SUB2 on which the seal part SL is formed, and the first substrate SUB1 and the second substrate SUB2 may be coupled to each other. The seal part SL may then be cured to complete the LCD.

In the LCD, since the overcoat layer OC may be formed of polysilsesquioxane or polysilazane, external moisture is effectively prevented from infiltrating into the liquid crystal layer LC.

In a conventional LCD, a moisture permeability (g/m²/ 366 h) with respect to a single layer of a common electrode is from about 131 to about 139; when the common electrode is formed on an organic polymer overcoat layer, the moisture permeability is from about 134 to about 139; and when the organic polymer overcoat layer is formed on the second base substrate, the moisture permeability is from about 135 to about 138. However, the moisture permeability with respect to a single layer of the organic polymer overcoat layer is from about 180 to about 199. Moisture may infiltrate into the liquid crystal layer from the edge of the LCD at which the seal part is formed through the organic polymer overcoat layer, and thus a defect, such as a vertical line stain, an edge dark area, etc., may occur in the edge of the display area. Particularly, when an upper surface of the organic polymer overcoat layer is exposed to the exterior in the edge of the liquid crystal display and makes contact with the liquid crystal layer, the defect is intensified.

In the LCD according to exemplary embodiments of the invention, the overcoat layer OC may be formed of the polysilsesquioxane, polysilazane, and/or derivatives thereof. Thus, the moisture may be prevented from being infiltrated into the liquid crystal layer LC through the overcoat layer OC. The moisture permeability of the overcoat layer is from about 125 to about 131 when the overcoat layer OC is formed of the polysilsesquioxane, polysilazane, and/or derivatives thereof. In addition, since the overcoat layer OC is overlapped with the seal part SL at the edge of the LCD, the upper surface of the overcoat layer OC is not directly exposed to the liquid crystal layer LC, so that the passing of the moisture through the overcoat layer OC to the liquid crystal layer LC may be prevented.

Figure 4:
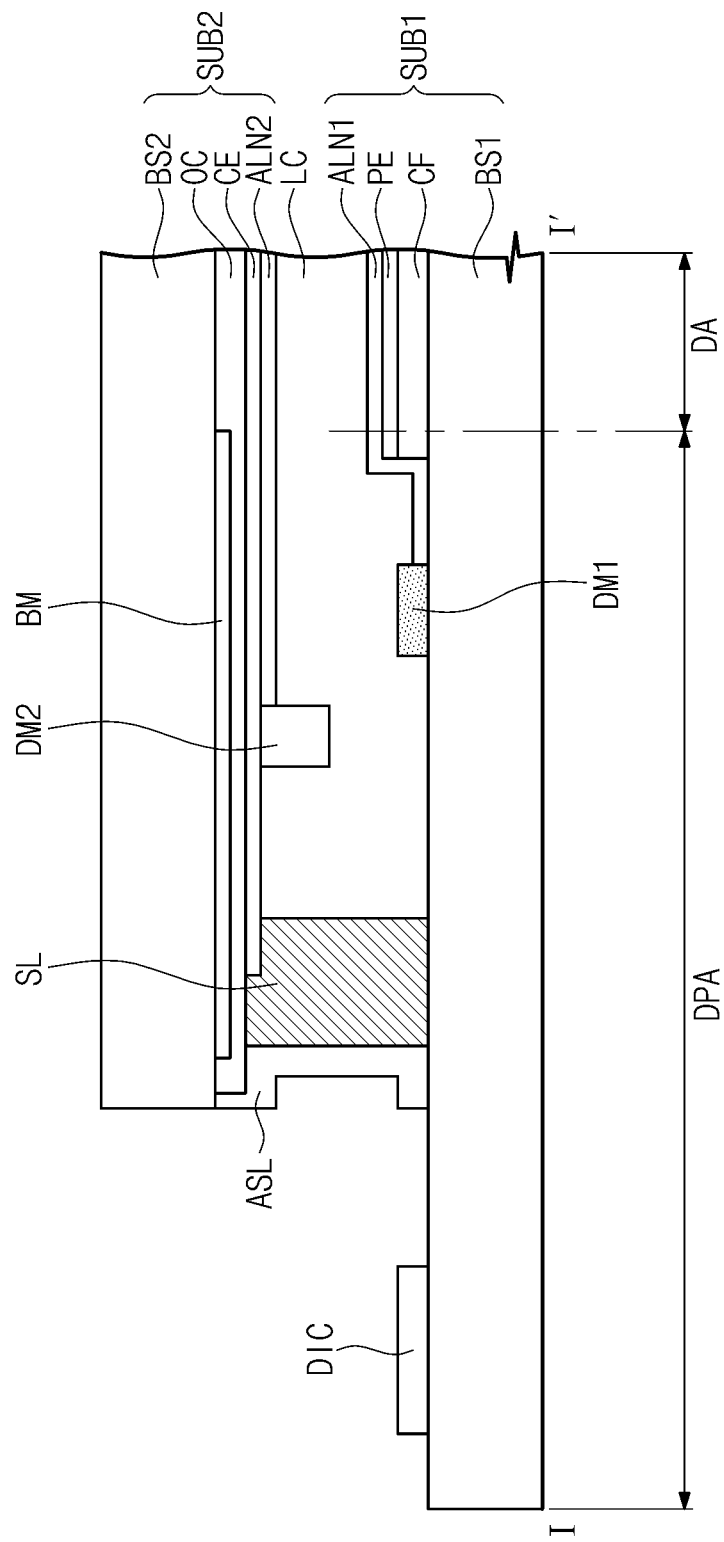
FIGS. 4, 5, 6, and 7 are cross-sectional views taken along the line I-I' of FIG. 1 according to exemplary embodiments of the invention.

FIG. 4 is a cross-sectional view taken along the line I-I' of FIG. 1 according to exemplary embodiments of the invention. In FIG. 4, the same reference numerals denote the same elements in FIG. 1, and thus detailed descriptions of the same elements are omitted.

Referring to FIG. 4, in some cases, the LCD may include an additional seal part ASL. The additional seal part ASL may be disposed along an edge of the second base substrate BS2 and may cover the seal part SL, such that the surface of the seal part SL is not exposed. The additional seal part ASL may directly contact a side surface of the seal part SL and upper and side surfaces of the overcoat layer OC. The additional seal part ASL may also directly contact a portion of the upper surface of the first base substrate BS1.

The addition seal part ASL may be formed of at least one of polysilazane, polysilsesquioxane, and derivatives thereof. The addition seal part ASL may also include a hydrophobic material, e.g., amorphous fluoropolymer.

The amorphous fluoropolymer may be at least one of polyvinylfluoride (PVF), polyvinylidene fluoride (PDVF), polytetrafluoroethylene (PTFE), polychlorotrifluoroethylene (PCTFE), perfluoroalkoxy polymer (PFA), fluorinated ethylene-propylene (FEP), polyethylenetetrafluoroethylene (ETFE), perfluorinated elastomer, fluorocarbon [chlorotrifluoroethylenevinylidene fluoride], perfluorosulfonic acid, and perfluoropolyoxetane.

In some cases, the amorphous fluoropolymer may be at least one of following materials: Tedlar® (DuPont™), Kynar® (Arkema™, Inc.), Solef®, Hylar® (Solvay Solexis S.p.A), Teflon® (DuPont™), Algoflon® (Solvay Solexis S.p.A), Polymist® (Solvay Solexis S.p.A), Kel-F® (3M), Neoflon™ (DAIKIN®), Hyflon® (Solvay Solexis S.p.A), Tefzel® (DuPont™), Fluon® (Asahi Glass Company), Halar® (Solvay Solexis S.p.A), Kalrez® (DuPont™), Tecnoflon® PFR (Solvay Solexis S.p.A), Viton® (DuPont™), Tecnoflon® FKM (Solvay Solexis S.p.A), Krytox® (DuPont™), Fomblin® (Solvay Solexis S.p.A), Nation® (DuPont™).

The polysilsesquioxane, polysilazane, derivatives thereof, and the amorphous fluoropolymer may be provided in a fluid state, and thus the addition seal part ASL may be formed in various ways, e.g., an inkjet method, a spin coating method, a slit coating method, etc. In the case that fluid from the addition seal part ASL is discharged to the edge of the liquid crystal display by the inkjet method using a nozzle, the fluid may move through a crack in the edge of the liquid crystal display by a capillary phenomenon.

To manufacture the LCD, the first substrate SUB1 and the second substrate SUB2 may be formed, and then the seal part SL is formed on either the first substrate SUB1 or the second substrate SUB2. The liquid crystal layer LC may then be formed on the first substrate SUB1 or the second substrate SUB2 on which the seal part SL is formed. The additional seal part ASL may subsequently be formed, and the first substrate SUB1 and the second substrate SUB2 may be coupled to each other. The seal part SL and the additional seal part ASL may be cured to complete the LCD. In some cases, the additional seal part ASL may be cured together with the seal part SL.

Accordingly, the LCD may prevent moisture from being infiltrated into the liquid crystal layer through the seal part SL and the additional seal part ASL. Since the seal part SL is formed of an organic polymer, the moisture may, in some cases, transmit through the seal part SL. However, the additional seal part ASL formed outside the seal part SL serves as an additional blocking layer to prevent the moisture from infiltrating into the liquid crystal layer. The liquid crystal layer is effectively separated from the exterior environment by the additional seal part ASL. In addition, since the amorphous fluoropolymer has a high hydrophobic property, the moisture may not easily penetrate into the liquid crystal layer.

Figure 5:
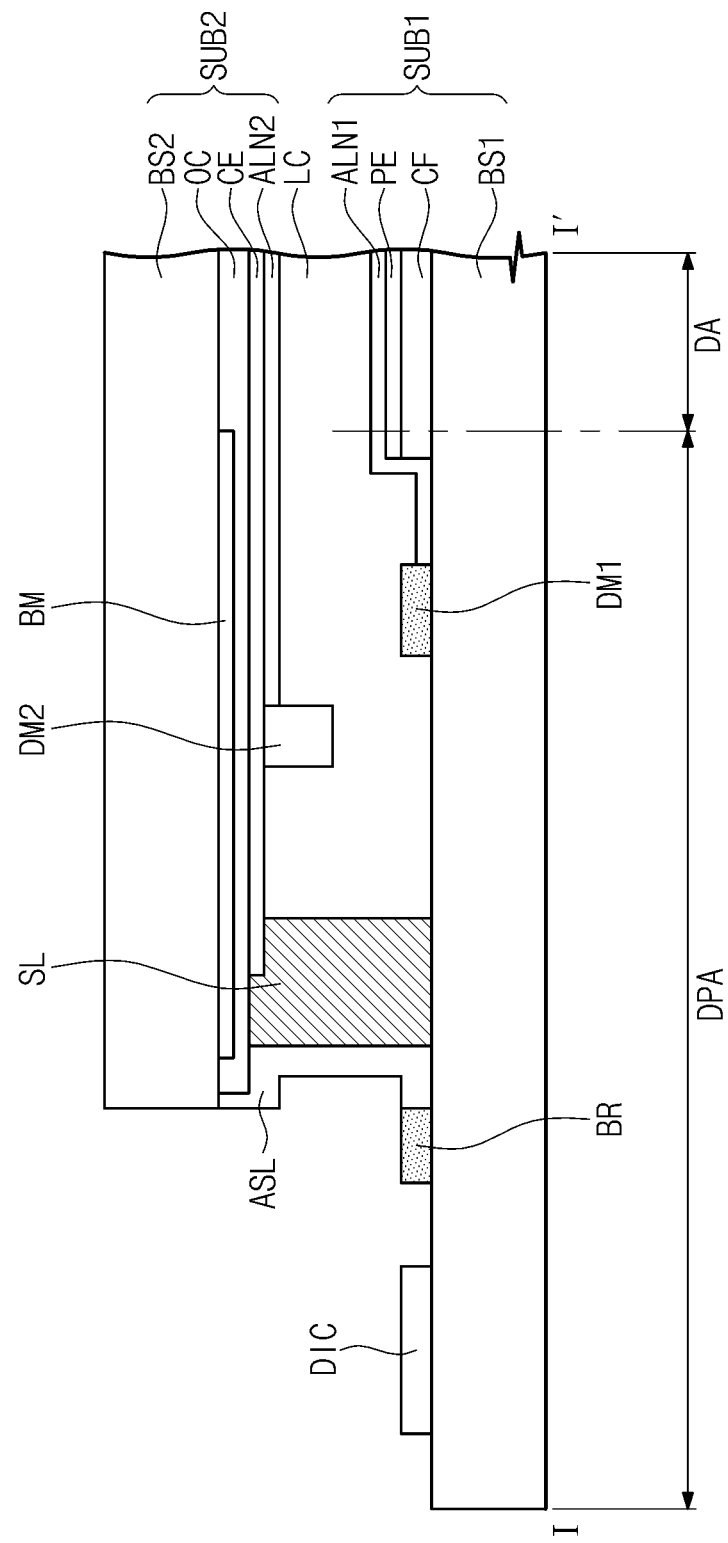

FIG. 5 is a cross-sectional view taken along the line I-I' of FIG. 1 according to exemplary embodiments of the invention.

Referring to FIG. 5, in some cases, the LCD may further include a barrier BR. The material forming the additional seal part ASL may be a fluid with a specific viscosity and the fluid is cured to form the additional seal part ASL. In this case, if the fluid flows into an area except the area covering the seal part SL and the overcoat layer OC, e.g., the area where the data driver DIC is, the fluid may cause defects, e.g., malfunctions of the data driver DIC. The barrier BR is configured to fix a position of the additional seal part ASL as a dam.

The barrier BR may protrude from the upper surface of the first base substrate BS1 and may directly contact the additional seal part ASL. The barrier BR may fix/restrict the position of the fluid for the additional seal part ASL such that the fluid for the addition seal part ASL does not move to another area when the additional seal part ASL is formed. The barrier BR may be disposed between the seal part SL and the driving part as shown in FIG. 5. Due to the barrier BR, fluid of the additional seal part ASL does not contact the data driver DIC.

The barrier BR may be formed on the first base substrate BS1 together with another element of the first base substrate BS1. For instance, the barrier BR may be formed of the same material as the color filters CF and/or the first dam DM1 through the same process. In this case, the barrier BR may have the same thickness as that of at least one of the color filters CF and/or the first dam DM1. In some cases, the barrier BR may be formed of the same material as the blue color filter of the color filters CF through the same process.

Since the position of the additional seal part ASL is restricted by the barrier BR, the additional seal part ASL may not affect other elements of the LCD, e.g., the driving parts, due to, for example, leakage of the fluid of the additional seal part ASL.

Figure 6:
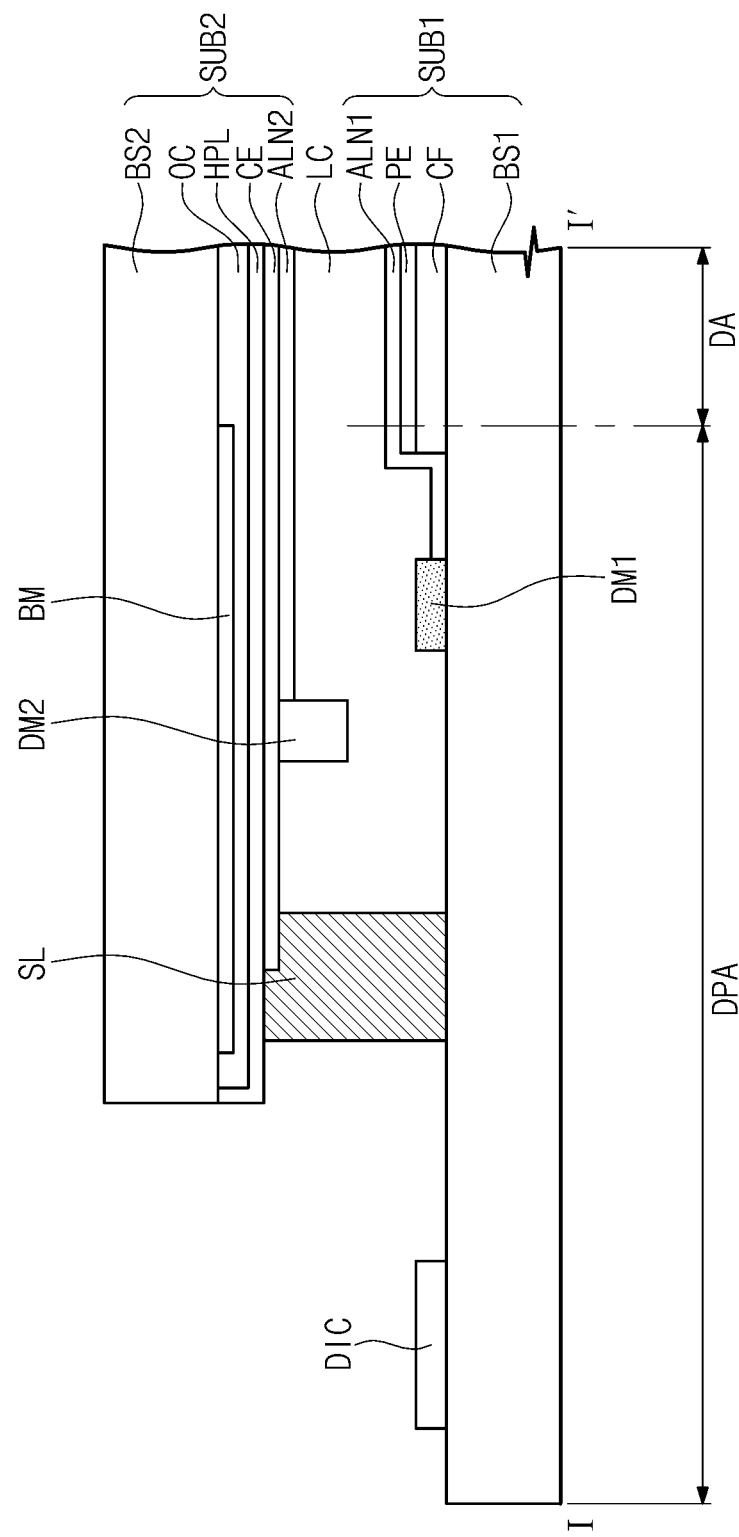

FIG. 6 is a cross-sectional view taken along the line I-I' of FIG. 1 according to exemplary embodiments of the invention.

Referring to FIG. 6, in some cases, the LCD may include a hydrophobic layer HPL disposed on the overcoat layer OC.

The hydrophobic layer HPL may cover an upper surface of the overcoat layer OC to prevent the upper surface of the overcoat layer OC from being exposed. The hydrophobic layer HPL may include hydrophobic material, e.g., the amorphous fluoropolymer.

The hydrophobic material may be a fluid, and thus the hydrophobic layer HPL may be formed in various ways, e.g., an inkjet method, a spin coating method, a slit coating method, etc.

In some cases, the overcoat layer OC may include an inorganic polymer, such as polysilsesquioxane, polysilazane, and derivatives thereof, or an organic polymer, such as polyvinylalcohol. Since the hydrophobic layer HPL may prevent moisture from being infiltrated into the liquid crystal layer LC, the overcoat layer OC may be formed of the organic polymer when the hydrophobic layer HPL is included.

Figure 7:
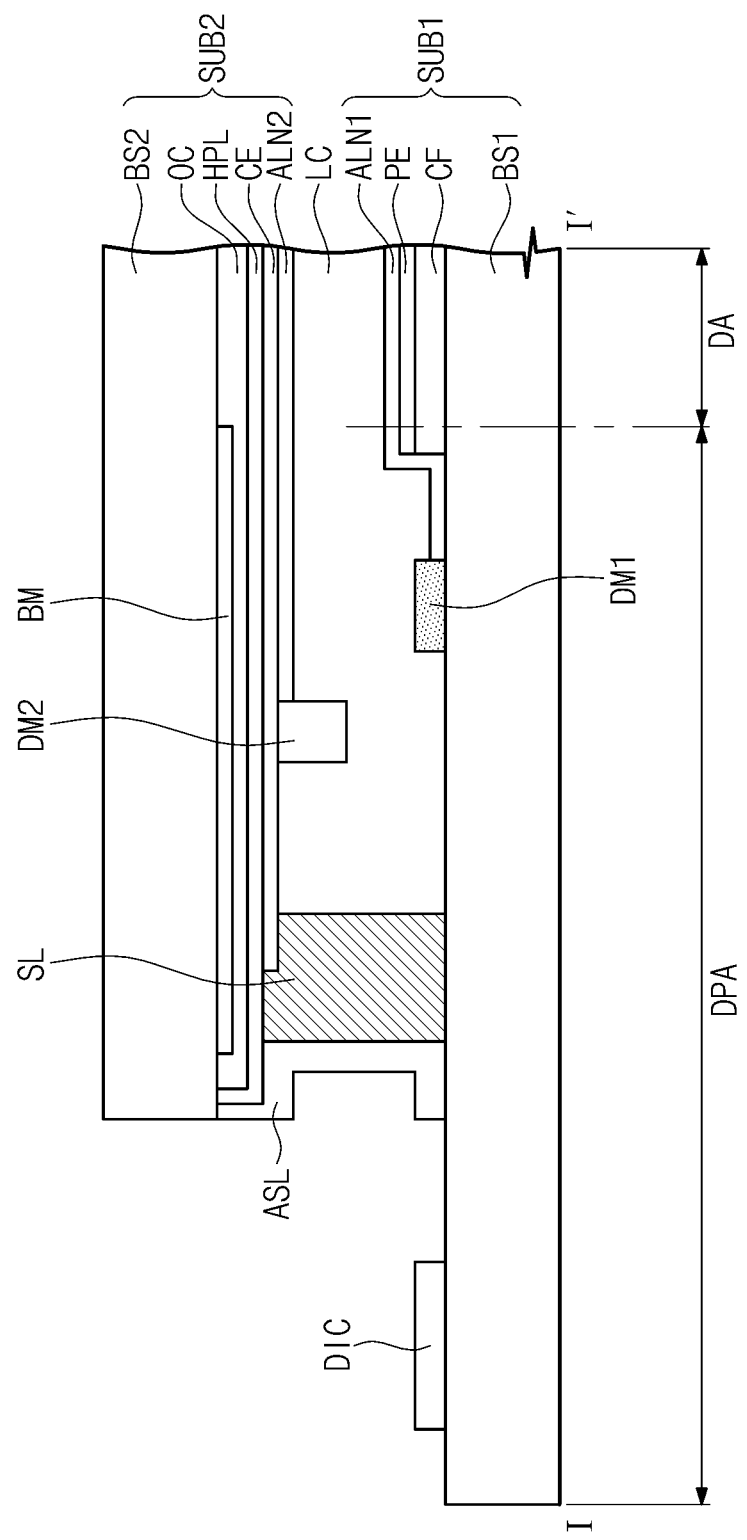

FIG. 7 is a cross-sectional view taken along the line I-I' of FIG. 1 according to exemplary embodiments of the invention.

Referring to FIG. 7, in some cases, the LCD may include an additional seal part ASL and the hydrophobic layer HPL. The additional seal part ASL may be disposed along an edge of the second base substrate BS2 and may cover the seal part SL such that the surface of the seal part SL is not exposed to the exterior environment. The additional seal part ASL may directly contact a side surface of the seal part SL and an exposed surface of the hydrophobic layer HPL. The additional seal part ASL may directly contact a portion of the upper surface of the first base substrate BS1.

In addition, although not shown in FIG. 7, the LCD may further include a barrier to fix a position of the addition seal part ASL, similar to the barrier BR shown in FIG. 5.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate;
a pixel electrode disposed on the first substrate;
a second substrate facing the first substrate;

a black matrix disposed on the second substrate;
an inorganic overcoat layer disposed on the second substrate and covering the black matrix, the inorganic overcoat layer providing a flat upper surface;
a common electrode disposed on the flat upper surface of the inorganic overcoat layer, the common electrode and the pixel electrode configured to provide an electric field;
a liquid crystal layer disposed between the first substrate and the second substrate;
a seal part disposed along an edge of the second substrate and disposed between the first substrate and the second substrate; and
an additional seal part disposed along the edge of the second substrate, the additional seal part being configured to cover the seal part and to prevent a surface of the seal part from being exposed,
wherein the inorganic overcoat layer comprises at least one of polysilsesquioxane, polysilazane, a derivative of the polysilsesquioxane, and a derivative of the polysilazane,
wherein the inorganic overcoat layer is configured to prevent external moisture from infiltrating into the liquid crystal layer and the common electrode, and
wherein the additional seal part comprises an amorphous fluoropolymer or at least one of polysilazane, polysilsesquioxane, a derivative of the polysilazane, and a derivative of the polysilsesquioxane.

2. The liquid crystal display of claim 1, wherein when the inorganic overcoat layer comprises at least one of the polysilsesquioxane and the polysilazane, the polysilsesquioxane comprises $[R_1—SiO_{3m2}]m$ and the polysilazane comprises $[R_2R_3Si—NR_4]n$,
wherein $R_1$, $R_2$, $R_3$, and $R_4$ independently denote hydrogen or one member of an alkyl group with a carbon number of 1 to 30, an alkene group with a carbon number of 1 to 30, an aryl group with a carbon number of 1 to 30, and an arylene group with a carbon number of 1 to 30, and
wherein each of m and n is in a range of 1 to 10,000.

3. The liquid crystal display of claim 2, wherein the common electrode partially overlaps with the seal part in plan view such that the seal part directly contacts an edge of the common electrode.

4. The liquid crystal display of claim 1, wherein the additional seal part directly contacts a portion of the inorganic overcoat layer and a portion of an upper surface of the first substrate.

5. The liquid crystal display of claim 1, further comprising a barrier disposed on an upper surface of the first substrate and directly contacting the additional seal part.

6. The liquid crystal display of claim 5, further comprising a color filter disposed on the first substrate, wherein the barrier comprises the same material as the color filter.

7. The liquid crystal display of claim 2, further comprising a hydrophobic layer comprising amorphous fluoropolymer, wherein the hydrophobic layer is disposed on the inorganic overcoat layer.

8. The liquid crystal display of claim 7, wherein the amorphous fluoropolymer comprises at least one of polyvinylfluoride (PVF), polyvinylidene fluoride (PDVF), polytetrafluoroethylene (PTFE), polychlorotrifluoroethylene (PCTFE), perfluoroalkoxy polymer (PFA), fluorinated ethylene-propylene (FEP), polyethylenetetrafluoroethylene (ETFE), perfluorinated elastomer, chlorotrifluoroethylenevinylidene fluoride, perfluorosulfonic acid, and perfluoropolyoxetane.

9. A liquid crystal display, comprising:
a first substrate;
a pixel electrode disposed on the first substrate;
a second substrate facing the first substrate;
an organic overcoat layer disposed on the second substrate, the organic overcoat layer comprising an organic polymer;
a common electrode disposed on the organic overcoat layer and spaced apart from the pixel electrode;
a liquid crystal layer disposed between the first substrate and the second substrate;
a seal part disposed between the first substrate and the second substrate to seal the liquid crystal layer; and
an additional seal part disposed along an edge of the second substrate coming into contact with the seal part, the additional seal part being configured to cover the seal part and to prevent a surface of the seal part from being exposed,
wherein the additional seal part comprises an amorphous fluoropolymer, or at least one of polysilsesquioxane, polysilazane, a derivative of the polysilsesquioxane, and a derivative of the polysilazane, and
wherein the additional seal part is configured to prevent external moisture from infiltrating into the liquid crystal layer.

10. The liquid crystal display of claim 9, wherein the common electrode is overlapped with the seal part.

11. The liquid crystal display of claim 9, wherein when the additional seal part comprises at least one of the polysilsesquioxane and the polysilazane, the polysilsesquioxane comprises $[R_1—SiO_{3/2}]m$ and the polysilazane comprises $[R_2R_3Si—NR_4]n$,
wherein $R_1$, $R_2$, $R_3$, and $R_4$ independently denote hydrogen or one member of an alkyl group with a carbon number of 1 to 30, an alkene group with a carbon number of 1 to 30, an aryl group with a carbon number of 1 to 30, and an arylene group with a carbon number of 1 to 30, and
wherein each of m and n is in a range of 1 to 10,000.

12. The liquid crystal display of claim 11, further comprising a hydrophobic layer comprising amorphous fluoropolymer, wherein the hydrophobic layer is disposed on the organic overcoat layer.

13. The liquid crystal display of claim 12, wherein the amorphous fluoropolymer comprises at least one of polyvinylfluoride (PVF), polyvinylidene fluoride (PDVF), polytetrafluoroethylene (PTFE), polychlorotrifluoroethylene (PCTFE), perfluoroalkoxy polymer (PFA), fluorinated ethylene-propylene (FEP), polyethylenetetrafluoroethylene (ETFE), perfluorinated elastomer, chlorotrifluoroethylenevinylidene fluoride, perfluorosulfonic acid, and perfluoropolyoxetane.

14. The liquid crystal display of claim 9, wherein the additional seal part directly contacts a portion of the overcoat layer and a portion of an upper surface of the first substrate.

15. The liquid crystal display of claim 14, further comprising a barrier disposed on the upper surface of the first substrate and directly contacting the additional seal part.

16. The liquid crystal display of claim 15, further comprising a color filter disposed on the first substrate, wherein the barrier comprises the same material as the color filter.

* * * * *